US011915278B2

(12) United States Patent
Ekstein et al.

(10) Patent No.: US 11,915,278 B2
(45) Date of Patent: Feb. 27, 2024

(54) SYSTEM AND METHOD FOR AUTOMATICALLY DETECTING DAMAGES IN VEHICLES

(71) Applicant: RAVIN AI LTD., Haifa (IL)

(72) Inventors: Eliron Ekstein, Even Yehuda (IL); Roman Sandler, Haifa (IL); Alexander Kenis, Kiryat Motzkin (IL); Alexander Serebryiani, Ashkelon (IL)

(73) Assignee: RAVIN AI LTD., Haifa (IL)

( * ) Notice: Subject to any disclaimer, the term of this patent is extended or adjusted under 35 U.S.C. 154(b) by 342 days.

(21) Appl. No.: 17/437,714

(22) PCT Filed: Mar. 9, 2020

(86) PCT No.: PCT/IL2020/050274
§ 371 (c)(1),
(2) Date: Sep. 9, 2021

(87) PCT Pub. No.: WO2020/183459
PCT Pub. Date: Sep. 17, 2020

(65) Prior Publication Data
US 2022/0148287 A1 May 12, 2022

(30) Foreign Application Priority Data
Mar. 13, 2019 (EP) .................................... 19162604

(51) Int. Cl.
*G06K 9/00* (2022.01)
*G06Q 30/0283* (2023.01)
(Continued)

(52) U.S. Cl.
CPC ..... *G06Q 30/0283* (2013.01); *G06Q 30/0645* (2013.01); *G06Q 40/08* (2013.01);
(Continued)

(58) Field of Classification Search
CPC .......... G06Q 30/0283; G06Q 30/0645; G06Q 40/08; G06V 10/751; G06V 2201/06; G07C 5/006
(Continued)

(56) References Cited

U.S. PATENT DOCUMENTS 8,892,293 B2 11/2014 Reichel et al.
2016/0140778 A1 5/2016 Bailly et al.
(Continued)

OTHER PUBLICATIONS

Wu, Yao, Zuochang Ye, and Yan Wang. "A Damage Identification System Based on Deep Learning." Proceedings of the 2019 7th International Conference on Information Technology: IoT and Smart City. 2019. (Year: 2019).*
(Continued)

*Primary Examiner* — Jonathan S Lee
(74) *Attorney, Agent, or Firm* — Nixon & Vanderhye PC (57) ABSTRACT

An automatic system for detecting a damage to a vehicle, comprising: (a) at least one camera for capturing "handover" and "return" images irrespective of the vehicle's movement or orientation relative to the camera; (b) a memory for storing images of basic-parts (c) a first determination unit for, based on the basic-parts images, determine the location of one or more basic-parts within the "handover" and "return" images; (d) a second determination unit configured to, based on the determined locations of the basic parts within the images, determine the locations of "other parts" within the "handover" and "return" images, thereby to form "handover" and "return" part-images, respectively; (e) a transformation unit configured to separately transform each pair of "handover" and "return" part-images, respectively, to a same plane; (f) a comparison unit configured to separately compare pixel-by-pixel each transformed pairs of "handover" and "return" part-images, to detect a difference above a predefined threshold.

21 Claims, 7 Drawing Sheets

(51) Int. Cl.
*G06V 10/75* (2022.01)
*G06Q 30/0645* (2023.01)
*G06Q 40/08* (2012.01)
*G07C 5/00* (2006.01)

(52) U.S. Cl.
CPC ........ *G06V 10/751* (2022.01); *G06V 2201/06* (2022.01); *G07C 5/006* (2013.01)

(58) Field of Classification Search
USPC ........................................................ 382/103
See application file for complete search history.

(56) References Cited

U.S. PATENT DOCUMENTS

| | | |
|---|---|---|
| 2017/0293894 A1 | 10/2017 | Taliwal et al. |
| 2018/0293552 A1 | 10/2018 | Zhang et al. |
| 2018/0293806 A1 | 10/2018 | Zhang et al. |
| 2019/0073641 A1 | 3/2019 | Utke |

OTHER PUBLICATIONS

Chavez-Aragon et al., "Vision-based detection and labelling of multiple vehicle parts", 2011 14th Intl IEEE Conference on Intelligent Transportation System (ITSC), Oct. 7, 2011, pp. 1273-1278.
International Search Report for PCT/IL2020/050274 dated May 18, 2020, 4 pages.
Written Opinion of the ISA for PCT/IL2020/050274 dated May 18, 2020, 5 pages.
International Preliminary Report on Patentability for PCT/IL2020/050274 dated Jul. 4, 2021, 20 pages.
Extended European Serarch Report for EP19162604 dated Aug. 19, 2019, 9 pages.
Li et al., "Applying Image Analysis to Auto Insurance Triage: A Novel Application", 2007 IEEE 9$^{th}$ Workshop on Multimedia Signal Processing, IEEE, Oct. 1-3, 2007, pp. 280-283.
Mallick "Image Alignment (Feature Based) using openCV (C++/Python)", Mar. 11, 2018, 10 pages.

* cited by examiner

Fig. 5b

SYSTEM AND METHOD FOR AUTOMATICALLY DETECTING DAMAGES IN VEHICLES

This application is the U.S. national phase of International Application No. PCT/IL2020/050274 filed Mar. 9, 2020 which designated the U.S. and claims priority to EP Patent Application No. 19162604.3 filed Mar. 13, 2019, the entire contents of each of which are hereby incorporated by reference.

FIELD OF THE INVENTION

The invention relates in general to the field of detection, assessment and estimation of damages in vehicles.

BACKGROUND OF THE INVENTION

The automotive industry and vehicle usage involve frequent and massive handovers of vehicles. The vehicles are expected to be delivered and returned in a certain condition, without added damage. Examples include: delivery of vehicles from a manufacturer to a customer, handing over of used vehicles to repair shops, dealers and customers, leasing/renting out a vehicle, sharing a personal vehicle, and assessing an insurance claim. Hereinafter, and unless specifically indicated otherwise, the discussion will assume the case of car rental, however, the invention may similarly be used for all the above-indicated cases as well. This situation requires a careful verification of the vehicle at the times of handover and return—and this is typically done by a visual check of the vehicle simultaneously by all the parties involved. From time to time, and even in cases where a visual verification is performed, disputes arise as to the differences between the condition of the vehicle at the times of handover and return, respectively, and as to the entity who is responsible for the damage (when observed). This situation involves even more complications when the vehicle is returned at a different geographical location than of the location of handover.

Several prior art systems suggest the capturing of images by cameras at the times of handover and return—these images were supposed to be used as a proof with respect to the conditions of the vehicle at the handover and return times. While these images can be used for verification in cases of dispute, they do not eliminate the necessity for a careful visual verification of the vehicle simultaneously by both parties and identification of damages. Alternatively, at a time of dispute, these captured images have to be visually analyzed.

Other prior art verification systems, such as those published in U.S. Pat. No. 8,892,293, US 2016/0140778 have tried to apply automatic image-comparison techniques to detect differences between respective images at the times of handover and return, however, with very poor reliability. Moreover, all such automatic verification systems require at least several of the following conditions to be met in order to be applied:

(a) Use of expensive, high-resolution cameras (for example, 15-20 megapixel cameras) for capturing images from all sides of the car;
(b) Positioning of the cameras at very specific locations and orientations relative to the vehicle, and adjusting them accordingly in order to capture reliable images that could later be used for damage observation and estimation;
(c) Stationary positioning of the vehicle at predetermined marked positions relative to the cameras in order to allow the automatic verification to be reliably performed;
(d) Use of expensive lighting and sensors;
(e) Dedicating a specific area only for the image capturing purposes;
(f) The control of the vehicle-positions and of the system performance requires human operators, who actually can perform the visual examination by themselves;
(g) The driving through such systems requires non-trivial driving efforts and may result in accident by itself;
(h) The operational costs of such systems are frequently higher than the damages that they try to capture.

The above conditions have resulted in very complicated, awkward, and expensive systems, that in fact require a professional employee in each of the systems for its operation and/or for the guidance of the driver to the exact stationary position, as noted in conditions [c] and [f] above. Therefore, instead of reducing the costs and simplifying the procedure of the damage detection and estimation, such prior art systems in many cases have in fact increased the costs and introduced even more complications.

It is therefore an object of the present invention to provide an automatic vehicle-damage detection system which is simple and of low-cost.

It is another object of the present invention to provide an automatic vehicle-damage detection system that can use relatively low-resolution cameras.

It is still another object of the present invention to provide an automatic vehicle-damage detection system that eliminates the necessity for assigning a specific area for carrying out the image-capturing. In more specific terms, it is an object of the invention to provide a system which may be installed even in the lane leading into or out of the car-rental company area without any interruption to other activities in this lane.

It is still another object of the present invention to provide an automatic car-damage detection system that eliminates the necessity for accurately positioning and adjusting cameras with respect to the car, and in fact a system leaving much freedom as to the locations of the cameras, even to an operation by a mobile phone camera.

It is still another object of the present invention to provide a system that eliminates the necessity for accurately stationary positioning the vehicle relative to the cameras. More specifically, it is an object of the invention to provide a system that can perform the car-damage detection based on images that are captured while the vehicle is in motion and in a random orientation relative to the cameras.

It is still another object of the present invention to provide a car-damage detection system that eliminates the necessity for assigning a trained employee for operating the system.

It is still another object of the present invention to provide a car-damage detection system that can detect damage to the car even at car locations at which there is no previously captured reference images from a same specific vehicle.

It is still another object of the present invention to provide a car-damage detection system that may also automatically suggest a cost estimation of the damage, sometimes even in a case which involves damage to a hidden part.

Other objects and advantages of the invention will become apparent as the description proceeds.

SUMMARY OF THE INVENTION

The invention relates to an automatic system for detecting a damage to a vehicle, comprising: (a) at least one camera for capturing "handover" and "return" sets of images of a vehicle, wherein each of the images within said sets is captured irrespective of the vehicle's movement or of the vehicle's orientation with respect to the capturing camera; (b) a memory for storing images of basic-parts of at least one vehicle; (c) a first determination unit which is configured to, based on said basic-parts images, determine the location of one or more basic-parts within images of said "handover" and "return" sets of images; (d) a second determination unit which is configured to, based on said determined locations of the vehicle's basic parts within the images, determine the locations of "other parts" of the vehicle within said "handover" and "return" sets of images, thereby to form "handover" and "return" part-images, respectively; (e) a transformation unit which is configured to separately transform each pair of "handover" and "return" part-images, respectively, to a same plane, wherein said transformation further includes performing of one or more of: displacement, rotation and zoom of a first image relative to the second image in the pair; (f) a comparison unit configured to separately compare pixel-by-pixel each of said transformed pairs of "handover" and "return" part-images, to thereby detect a difference above a predefined threshold, to alert when such a difference above the threshold is detected.

In an embodiment of the invention, said "handover" and "return" sets of images are captured at different times, possibly by different sets of one or more cameras.

In an embodiment of the invention, each of the cameras has a resolution of at least 2 megapixels.

In an embodiment of the invention, said alert further comprising a location indication within at least one part-image in the pair.

In an embodiment of the invention, said first determination unit applies image recognition techniques.

In an embodiment of the invention, said at least one camera is a mobile-phone camera.

In an embodiment of the invention, said at least one camera is an in-vehicle camera of another vehicle.

In an embodiment of the invention, said set of "handover" images is a reduced set, comprising the vehicle's one-side only images, and wherein the system further comprising a mirroring module which is configured to transform an image of a first side of the vehicle to an image of the second side of the vehicle.

In an embodiment of the invention, each of said "handover" and "return" sets comprising images that cover the entire exterior of the vehicle.

In an embodiment of the invention, the system further comprising a damage-cost database, and a module for estimating the cost of the damage based on a part which was indicated by said alert and on said damage-cost database.

In an embodiment of the invention, the system is designed to be used by one or more of: a vehicle's car-rental or leasing company, a vehicle fleet-operation company, an insurance company, a vehicle maintenance shop, an autonomous-vehicle operation company, car selling company, a vehicle-sharing company, or by a car dealer shop.

The invention also relates to a method for automatically detecting a damage to a vehicle, comprising: (a) storing at a memory images of basic-parts of at least one vehicle; (b) capturing by at least one camera a set of "handover" images of a vehicle, each of the images is captured irrespective of the vehicle's movement or of the vehicle's orientation with respect to the capturing camera; (c) capturing at a later stage a set of "return" images of the vehicle, each of the images is also captured irrespective of the vehicle's movement or of the vehicle's orientation with respect to the capturing camera and possibly also by different cameras than those who captured said "handover" images; (d) activating a first determination unit to determine, based on said basic-parts images, the location of one or more basic-parts within images of said "handover" and within images of said "return" sets of images; (e) activating a second determination unit to determine, based on said locations of the vehicle's basic parts within the images, the locations of "other parts" of the vehicle within said "handover" and "return" sets of images, thereby to form "handover" and "return" part-images, respectively; (e) activating a transformation unit to separately transform each pair of "handover" and "return" part-images, respectively, to a same plane, wherein said transformation further includes performing of one or more of: displacement, rotation and zoom of a first image relative to the second image in the pair; (f) separately comparing pixel-by-pixel each of said transformed pairs of "handover" and "return" part-images, to thereby detect a difference above a predefined threshold, and to alert when such a difference above the threshold is detected.

In an embodiment of the invention, each of the cameras has a resolution of at least 2 megapixels.

In an embodiment of the invention, said alert further comprising a location indication within at least one part-image in the pair.

In an embodiment of the invention, said first determination unit applies image recognition techniques.

In an embodiment of the invention, said at least one camera is a mobile-phone camera.

In an embodiment of the invention, said at least one camera is an in-vehicle camera of another vehicle.

In an embodiment of the invention, said set of "handover" images is a reduced set, comprising the vehicle's one-side only images, and wherein the method further comprising a mirroring step which for transforming an image of a first side of the vehicle to an image of the second side of the vehicle.

In an embodiment of the invention, each of said "handover" and "return" sets comprising images that cover the entire exterior of the vehicle.

In an embodiment of the invention, the method comprising the formation of a damage-cost database, and further comprising a step of activating a module for estimating the cost of the damage based on a part which was indicated by said alert and on said damage-cost database.

In an embodiment of the invention, the method is designed for use by one or more of: a vehicle's car-rental or leasing company, a vehicle fleet-operation company, an insurance company, a vehicle maintenance shop, an autonomous-vehicle operation company, car selling company, a vehicle-sharing company, or by a car dealer shop.

DETAILED DESCRIPTION OF PREFERRED EMBODIMENTS

Figure 1:
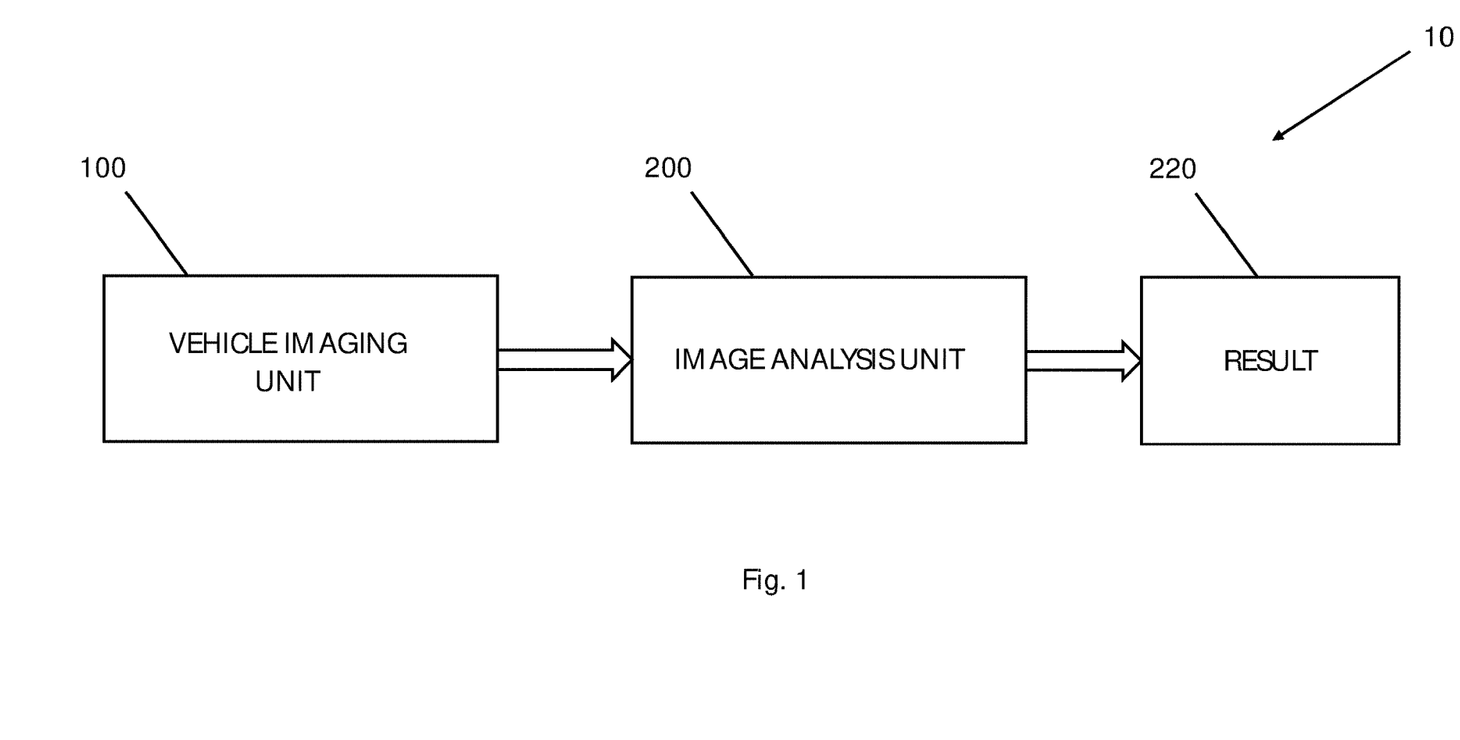
FIG. 1 schematically shows in a block diagram form a general structure of a system for automatically detecting a vehicle-damage, according to an embodiment of the present invention.

FIG. 1 schematically shows in a block diagram form a general structure of system 10 for automatically detecting a vehicle-damage, according to an embodiment of the present invention. The system generally includes (a) a vehicle imaging unit 100 and (b) an image analysis unit 200. The vehicle imaging unit 100 captures vehicle images in two timely-separated sessions. The image analysis unit 200, in turn compares between respective images from the two sessions, and provides an indication 220 as to whether a damage has occurred to the vehicle during the period between these two image-capturing sessions. The system of the invention may be applied, for example, by a vehicle rental company. The following discussion will assume use of the inventive system by a car-rental company. However, the system may alternatively be used in a similar manner by any other entity who needs an automatic detection of a vehicle damage.

In an embodiment of the invention, two sets of images of the vehicle are captured, a first set (hereinafter, a "handover" or "reference" set) is captured at the time of the vehicle handover, and a second set (hereinafter, a "return" set) at the time when the vehicle is returned to the vehicle rental company.

Figure 2:
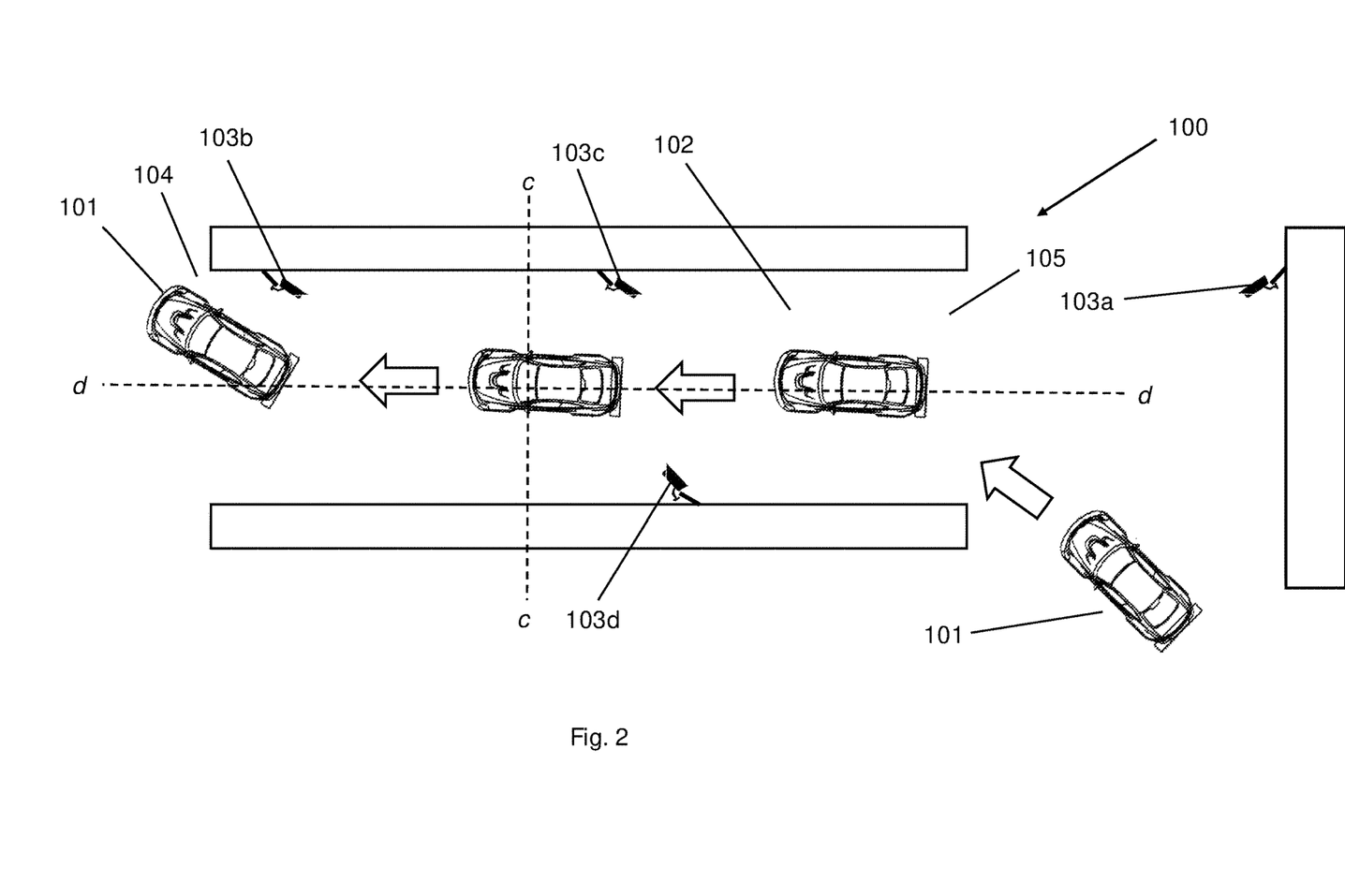
FIG. 2 generally illustrates a structure of a vehicle imaging unit according to an embodiment of the invention.

FIG. 2 generally illustrates a structure of the vehicle imaging unit 100 according to an embodiment of the invention. For example, and following the handover of the vehicle 101, and on his way out of the parking lot area, the driver of vehicle 101 passes through an image capturing lane 102 where one or more cameras 103a-103n are activated to capture still or video images of the vehicle that cover the entire external surface of the body of the car. The vehicle 101 moves in a free movement fashion within the lane 102, for example, at a speed of 15-25 Km/h, without any necessity to stop, until leaving the image capturing lane at the exit 104. The one or more cameras 103a-103n may be positioned at any convenient height or lane-position, or may be supported by any convenient structure (such as one or more walls, poles, etc.), as long as each of the cameras covers at least one surface of the vehicle during the vehicle 101 passage through the lane 102, and while a selection of images from the set of captured images can form a full coverage of the external surface of the vehicle body—generally excluding the bottom surface. At the end of the image capturing session, a first ("reference", or "handover") set of images is formed and conveyed to the image analysis unit 200 and stored there for a later use. Later on, when the driver of vehicle 101 arrives back to a vehicle-return facility in order to return the vehicle, the same procedure is repeated by a vehicle imaging unit 100, a second ("return") set of images is captured, and then conveyed and stored within the image analysis unit 200. It should be noted that according to the present invention there is no limitation to the direction of the vehicle passage through the lane 102, so, at the time of the vehicle return, the vehicle may dynamically pass through the lane 102 in a direction opposite to the one shown in FIG. 2, namely, this time in a direction from the "exit" 104 to the "entry" 105. Moreover, the "return" image-capturing session may be performed by another physical vehicle-imaging unit 100 which may be located at another geographical location relative to the unit 100 which performed the "handover" image capturing session.

Therefore, at the end of the "handover" and "return" two image capturing sessions, two respective sets of images are stored within the image analysis unit 200 of the system. The two sets of images guarantee that there will be at least two images, namely at least one "handover" image and at least one "return" image respectively, that cover each of the front, rear, right, left, and roof surfaces of the vehicle. However, in view of this "free-vehicle movement" fashion where the images are captured substantially randomly (in terms of time and relative orientation), there is no guarantee whatsoever that following these two sessions there will be found any pair of corresponding ("handover" and "return") images that show any relevant surface of the vehicle in said pair from an exact distance, zoom, and orientation relative to the capturing camera. This situation raises significant technical difficulties when trying to perform automatic comparison of relevant images to determine whether a damage has occurred during the period in between the two "handover" and "return" sessions.

It should be noted that a set of images from another vehicle which is known to be perfectly clear of damages, hereinafter, a "clear of damage" set, may be used as an alternative to the "handover" set of images, assuming that it is agreed by the car-rental company and the customer that the vehicle was clear of damages at the time of handover. Moreover, the "clear of damage" set may even be a reduced set, and in such a case, the system may apply knowledge of symmetry and mirroring in order to compare various parts of the vehicle. For example, an image of a left-front door in a "clear of damage" set of images may be compared to a right-front door image in the "return" set of images, while utilizing symmetry and/or mirroring.

Figure 3:
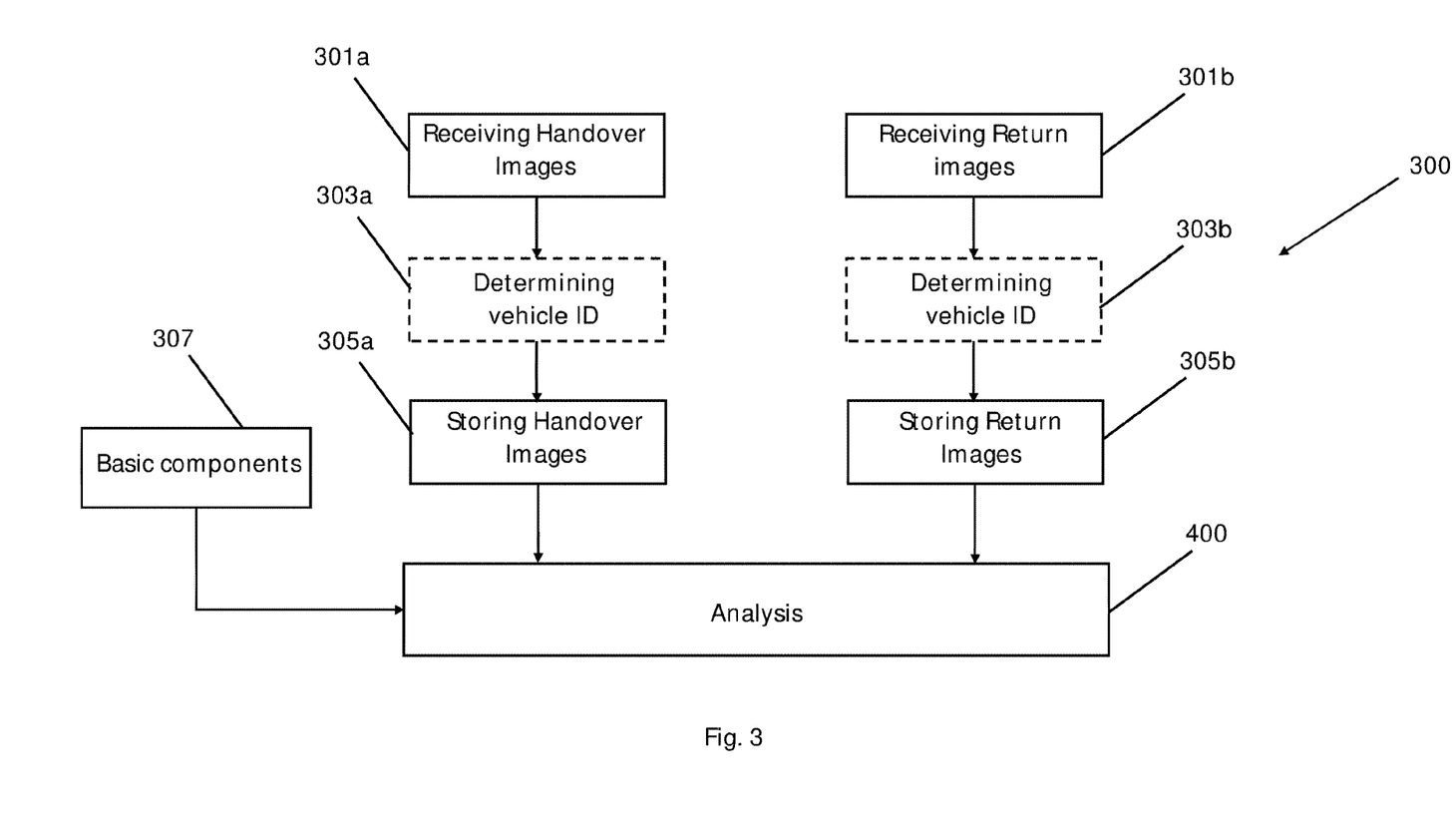
FIG. 3 generally illustrates in a flow diagram form a procedure which is performed by the image analysis unit of the invention.

FIG. 3 generally illustrates in a flow diagram form a procedure which is performed by the image analysis unit 200 of the invention. In steps 301a and 301b the "handover" and the "return" sets of images are received from the vehicle imaging unit 100. In the optional steps 303a and 303b, the ID of the vehicle is determined automatically based on performing an OCR on the plate of the vehicle within suitable images, respectively, and each of the sets is stored 305a, 305b respectively in a folder, such that they can be easily found later on. Steps 303a and 303b are optional, as the two sets may be similarly stored based on, for example, their respective times of capturing, etc. In step 400, the analysis is initiated. As will be elaborated hereinafter, the analysis step 400 involves a comparison between respective "handover" and "return" images to automatically determine whether a "noticeable" difference exists. Among others, the analysis step 400 is based on a database of images of vehicle basic components 307. The basic components are typically, but not exclusively, those vehicle parts that have almost a same shape in a vast number of vehicles, irrespective of the vehicle manufacturer, year of manufacturing, model, etc. Such basic components may include, for example, the vehicle door-handles, wipers, the right and left mirrors, the 4 wheels, the license plates, lights, manufacturer symbols etc.

Figure 4A:
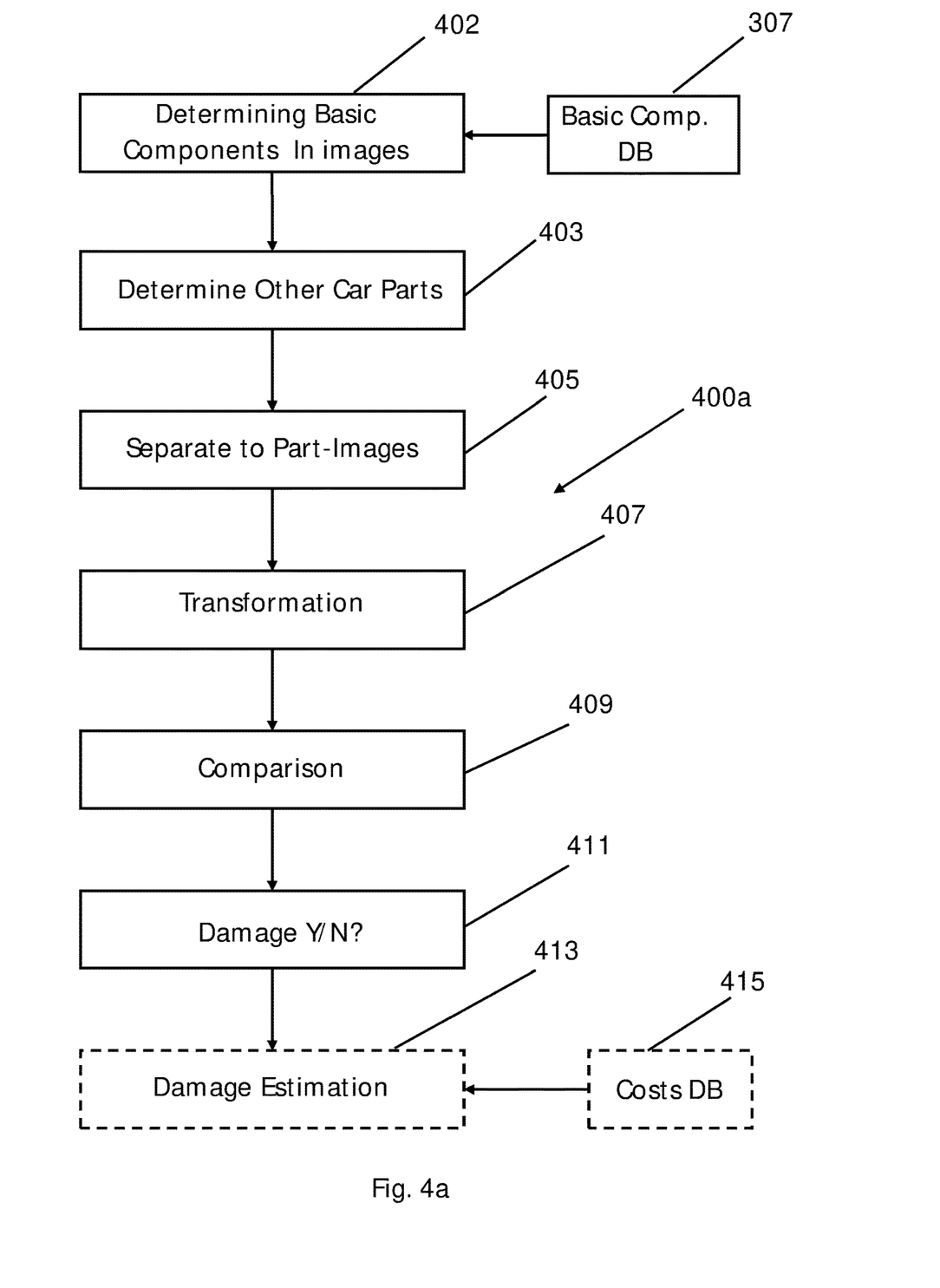
FIG. 4a describes in a flow diagram form how an analysis procedure for automatically detecting damage to the vehicle is performed.

FIG. 4a describes in a flow diagram form how an analysis procedure 400a for automatically detecting damage to the vehicle is performed. In a preliminary step 402 the basic-components database 307 (appearing also in FIG. 3) is prepared. As noted, the basic components (such as door-handles, the wipers, the right and left mirrors, the 4 wheels, the license plates, lights, etc.) are those vehicle parts that typically have a substantially same visible shape irrespective of the vehicle manufacturer or vehicle model. The database 307 contains a plurality of images showing a variety of door-handles, a variety of wipers, a variety of mirrors, etc. Based on the database 307, and by applying image recognition techniques on images from the "handover" and the "return" sets, the procedure identifies in step 402 these basic components within the two sets of images (or within selected images from the two sets that cover the entire car).

Based on the basic components, as identified within respective images of the "handover" and "return" sets, other, generally larger parts of the car ("other parts"), such as the doors, the front and rear bumpers, the roof, the hood, or any other facet of the car, etc. are identified in step 403 within the two sets of images. This step, in fact uses the identification of the basic components, whose locations relative to the other parts of the vehicle are substantially constant, as a guide to determine the other parts of the vehicle within respective pairs of "handover" and "return" images. However, each of the identified "other" parts, which is seen in a "handover" image from a specific perspective, is most probably sheen at the "return" image in the pair from another, at least slightly different perspective. This situation results from the fact that the images are captured while the vehicle is in a "free" (unguided and unrestricted) movement during the image capturing sessions (in contrast to some prior art publications where the vehicle must be stationary at a specific location and orientation relative to the camera during the image capturing sessions), and from the fact that according to the invention the "handover" and the "return" images may be captured by two separate systems that are geographically remote, or from the fact that the vehicle moved in opposite directions while capturing the two sets of images, respectively. This situation in fact very significantly complicates the ability to perform an accurate image comparison between two respective images in the pair, as required for an accurate damage determination. More specifically, this situation requires solving a very challenging computer vision problem, in order to accurately compare between two respective images in the pair and to determine the damage. Next, in step 405 the images of each of the "other" parts are cropped, respectively from the pair of images that show the entire car, forming for each part a pair containing "handover" and the "return" part-images, respectively. As noted, however, the pairs of the part-images of step 405 are not yet qualified for comparison, in view of the differences (even slight) of perspectives. In order to resolve this problem, the procedure transforms in step 407 the plane of each part-image in each pair to a common plane. This transformation also involves a rotation, zoom, and displacement for a best match. For example, a common plane for the substantially vertical doors (or other parts that are best seen in the side view of the car) may be, for example a vertical plane which is parallel to the longitudinal axis d of lane 102 (see FIG. 2). A common plane for the substantially (or relatively) horizontal roof and hood (or other similar parts) may be, for example a horizontal plane which is substantially parallel to the surface of lane 102. A common plane for the substantially (or relatively) horizontal roof, hood, etc. may be, for example a horizontal plane which is substantially parallel to the surface of lane 102. A common plane for those parts that are best seen in the front or rear views of the vehicle may be, for example, a vertical plane which is substantially parallel to transverse axis c of lane 102. In any case, for each specific pair of part-images (that show respectively a same part as appears in the "handover" and "return" sets, the parts are transformed to a common plane, bringing a basis for comparison between these part-images, respectively. A technique for performing this transformation can be found, for example, in "Multiple View Geometry in Computer Vision" (Second Edition), Chapter 7, Richard Hartley & Andrew Zisserman, Cambridge University Press. Specifically, without loss of generality, let a "handover" part image I_h(\vec{p_i}) be already in the comparison plane. Let the "return" part image I_r(\vec{p^t_i}) be rotated to the same plane with transform T as \vec{p^t_i}=T\vec{p_i}, where p=[x,y,1] vectors having x and y coordinates of the image plane and T is 3×3 matrix. Then, finding T is a 8 dimensional optimization problem (T[3,3] is always 1) that can be run directly on pixels of two part images, or more commonly on sampled "key" points having similar spatial directional derivatives. Since the optimization is linear many known off-the-shelf convex optimization toolbox can be used to solve this problem.

Next, in step 409 a comparison is performed respectively for each part, between the transformed "handover" and "return" part-images. The comparison step 409 involves a preliminary step of scaling, rotation, and displacement in order to obtain a best basis for comparison. Step 409 performs a pixel-by-pixel comparison, and if a difference in color, hue, intensity, etc. above a predefined threshold is identified for a pixel, or a group of pixels, an alert is issued in step 411, as this may be a sign for a damage in the part. The comparison is similarly performed for substantially all the parts of the car. The comparison may also be performed in grayscale-type images, rather than color images.

Experiments have shown that the system of the invention may use a relatively low-resolution cameras, starting from 2 megapixels each.

The procedure may end in the above step 411, or it may continue to the damage estimation step 413. The damage in various parts can be estimated automatically. For example, a scratch above a predefined dimension in a door of the vehicle may require replacement of the entire door. If the cost of a door-replacement (the cost of the part and the work involved) is stored in database 415 for each part, the damage estimation step 413 may provide automatically the entire damage estimation.

The "handover" and "return" sets of images may not necessarily be captured from the exact same car. In an embodiment of the invention, the "handover" set (a "reference" set) is captured from a vehicle of substantially the same model as of the "return" set which is known to be clear of any damage.

Figure 4B:
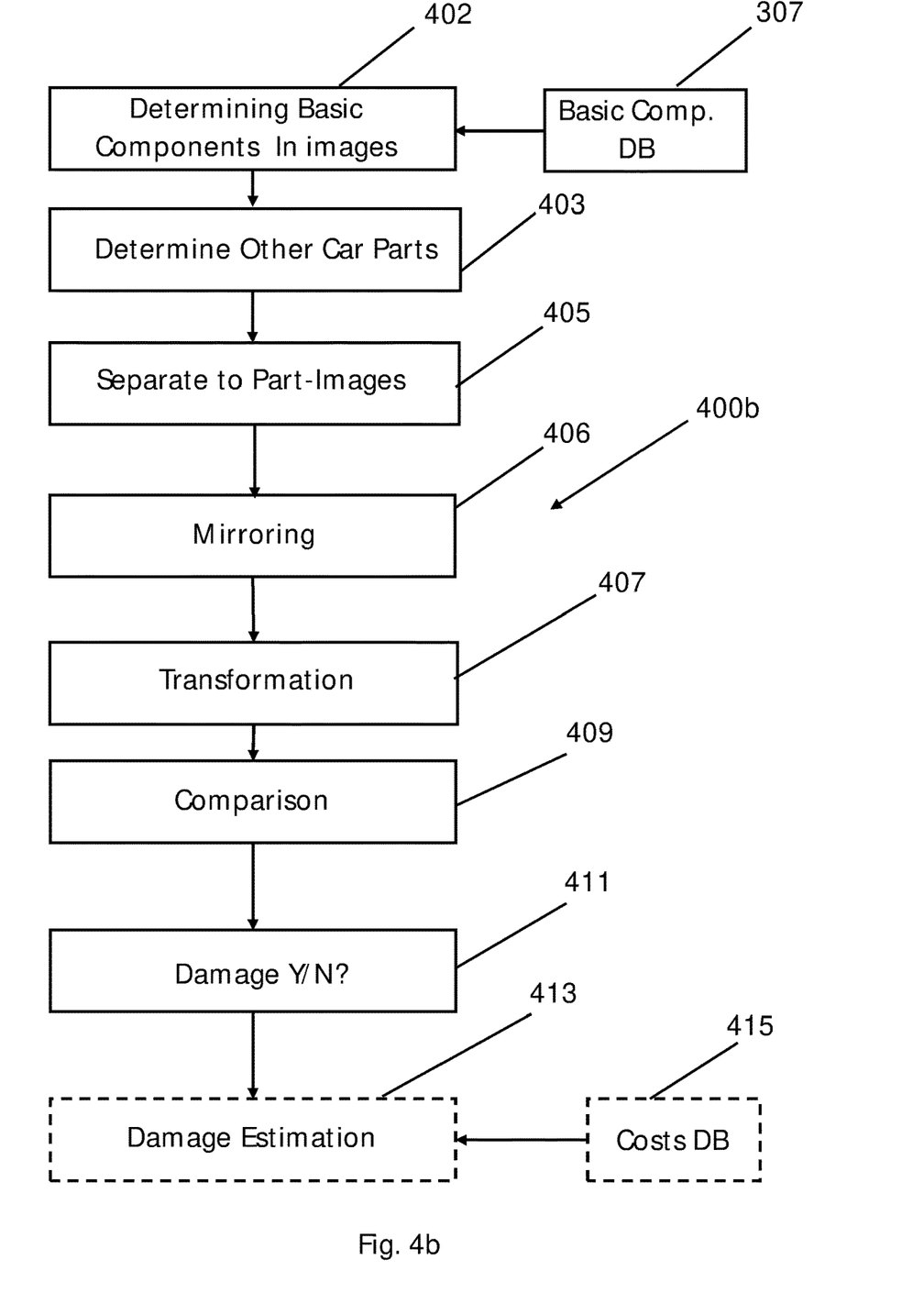
FIG. 4b describes in a flow diagram form how an analysis procedure for automatically detecting damage to the vehicle is performed, when only a one-side "handover" set of images is available.

Moreover, the system of the invention may be satisfied with a reduced set of "handover" images. For example, the "handover" ("reference") set may include images of only one side of the vehicle, for example, the right side. This procedure is described in FIG. 4b. In such a case, the right-side parts are processed in steps 407 and 409 in a manner as described with respect to FIG. 4a. The processing of the left-side parts includes a preliminary step 406 of "mirroring" (shown in FIG. 4b), in which the view of the part is mirrored, to be ready for comparison. The "mirroring" step 406 in fact mirrors the right-side part which is clear of damage, thereby to form a "left-side" part which is clear of damage, to be ready for comparison. An experiment has shown a full applicability of this approach.

In an embodiment of the invention, a mobile-phone camera may be used to capture the one or more of the "handover" and "return" sets of images. As before, the images may be captured irrespective of the zoom or orientation of the car with respect to the camera, and irrespective of whether there is a relative motion between the vehicle and the mobile camera.

The use of video cameras, rather than still cameras in conjunction with the invention is preferable, as it reduces effects of a lack of special and costly lighting. In this respect, the fact that there is a relative motion between the vehicle and the camera, and that video cameras are used is advantageous, as this significantly reduces the chance that a bright area which may appear in one specific image may appear in other sequential images (at least at the same location of the part). It should be noted that comparison of bright pixels in images is substantially ineffective.

EXAMPLE

Figure 5A:
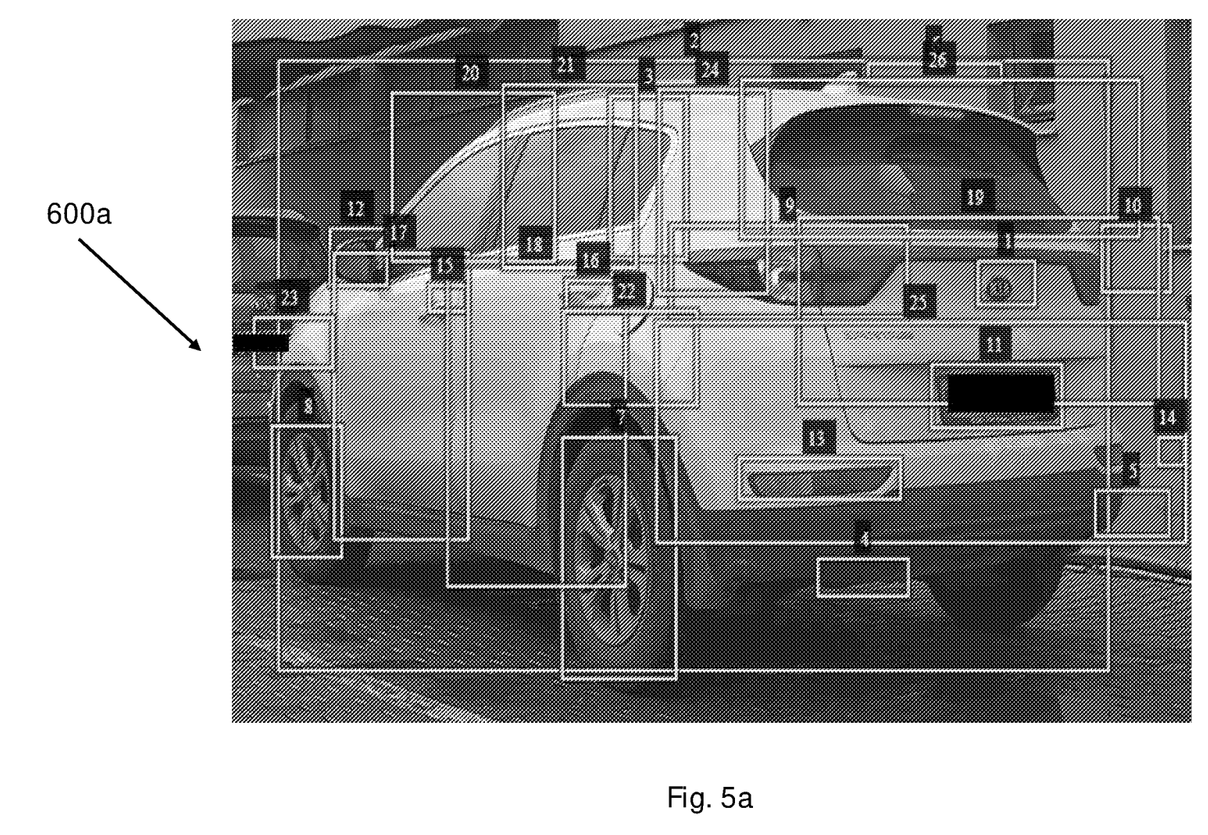
FIG. 5a shows a "handover" image of a rear-left side of a car as captured by a video camera having a resolution of 4 Megapixels.
Figure 5B:
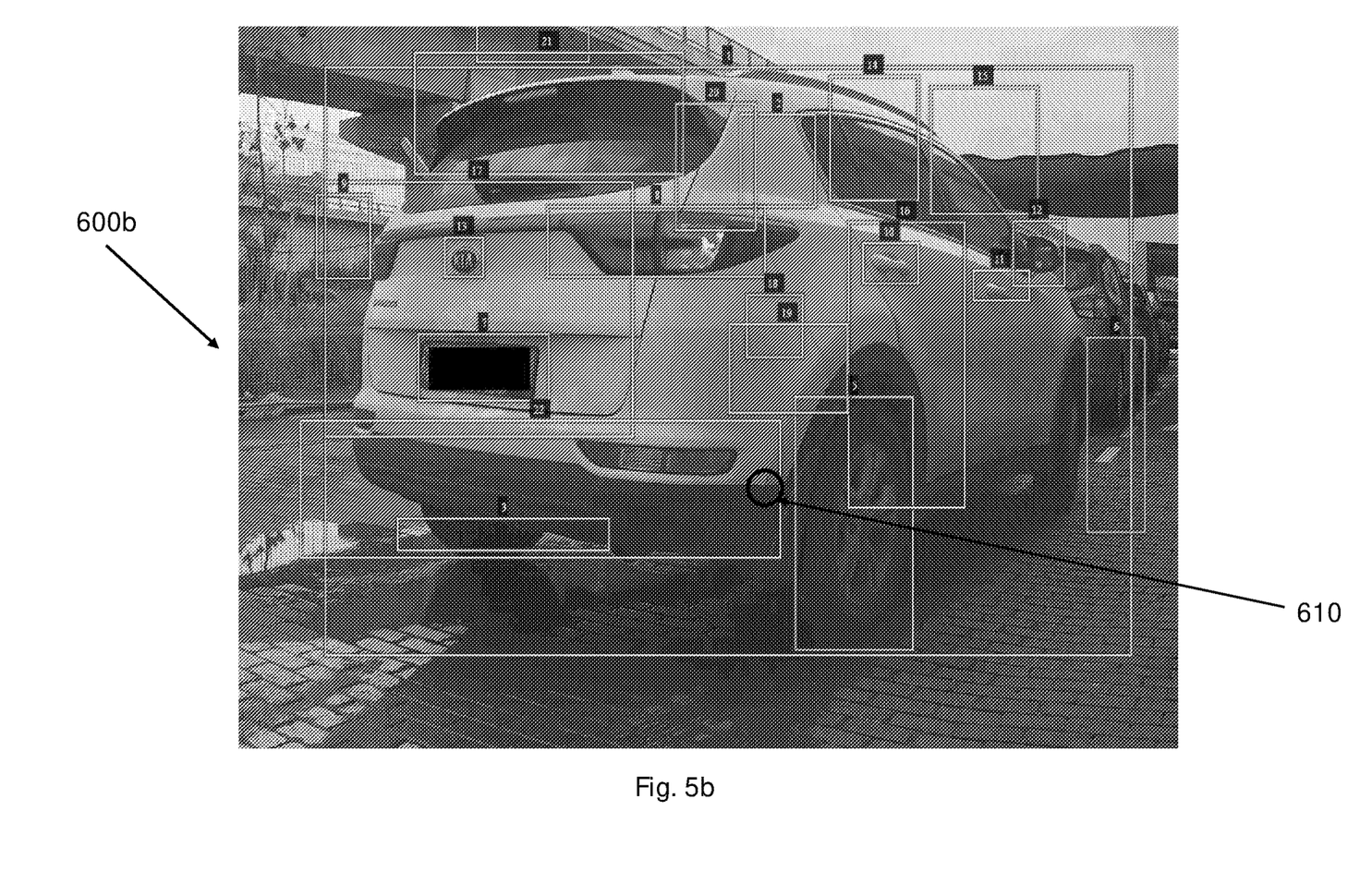
FIG. 5b shows "basic parts", as well as the "other parts", as determined by the analysis method of the invention on a "return" image, as well as a detected damage.

FIG. 5a shows an image 600a of a car. The image which shows the rear-left side of the car is one of several tens of images that were captured by a video camera having a resolution of 4 Megapixels. These images were stored as the "handover" set for a future comparison. The images of the car were analyzed according to the fully automatic process of FIG. 4a, and the rectangular frames shown within the image relate to "basic parts" and "other parts" that were determined during the process. Later on, a "return" set of several tens of images was captured by a video camera, this time showing the rear-right side of the car. The images were again analyzed by the system of the invention, determining the "basic parts", as well as the "other parts", as shown by the various rectangular frames within the image 600b in FIG. 5b. The system of the invention has repeatedly performed the "mirroring" step 406, the transformation step 407, and the comparison step 409 between pairs of images of the "handover" and "return" sets. The comparison was performed, separately in each pair with respect to each of the parts. Upon completion of the procedure, the system has detected a tiny scratch 610 (shown in FIG. 5b) at the right-side of the car. This detection was obtained, even though the reference images were left-side images, while the scratch existed at the right-side of the car. For the purpose of the procedure, several corresponding "basic parts" were identified in the pair of "handover" 600a and "return" 600b images (of FIGS. 5a and 5b), respectively, as follows: a left-rear wheel indicated by frame 7 in image 600a which corresponds to right-rear wheel—frame 5 in image 600b, a rear plate indicated by frame 11 in image 600a which corresponds to the rear plate—frame 7 in image 600b, a rear symbol indicated by frame 1 in image 600a which corresponds to the rear symbol—frame 13 in image 600b, a main left-rear light indicated by frame 9 in image 600a which corresponds to the main right-rear light—frame 8 in image 600b, a left mirror indicated by frame 12 in image 600a which corresponds to the right mirror—frame 12 in image 600b, and left-front and left-rear handles indicated by frames 15 and 16, respectively in image 600a that correspond to the right-front and right-rear handles—frames 11 and 10 in image 600b.

The system of the invention may also be used to detect damages in a fleet of shared vehicles (for example, autonomous cars). In such a case, the system may be installed at various locations, such as, gas stations, and in such a manner, the frequency of repeated verifications for a possible damage can be significantly increased.

The system may also be used by organizations that operate a fleet of autonomous-cars. Such organizations typically depend on remote and in-depot assessment of their conditions post incidents. For this purpose, cameras may be positioned on sites as well as on vehicles, or mobile phone cameras may be alternatively be used to capture incident damages to allow usability assessment of vehicles, and a possible necessity for response.

The system of the invention may be used by a variety of organizations, for example, by car a rental company, a car leasing company, vehicle sharing organizations, car selling (new or used) organization, or any similar organization that handles vehicles. In some cases, the system may be operated by a third-party.

The invention may also be used by insurance organizations to detect and assess insurance claims, for example, to assess a vehicle condition, rather than analysis of specific damages as reported by a subjective party such as the customer, an estimator, or a mechanic.

The system of the invention reduces the cost of the vehicle's inspection, and provides indications in an objective, accurate, and transparent manner to all the parties involved.

While some embodiments of the invention have been described by way of illustration, it will be apparent that the invention can be carried into practice with many modifications, variations and adaptations, and with the use of numerous equivalents or alternative solutions that are within the scope of persons skilled in the art, without departing from the spirit of the invention or exceeding the scope of the claims.

The invention claimed is:

1. An automatic system for detecting a damage to a vehicle, comprising:
   a. at least one camera for capturing "handover" and "return" sets of images of a vehicle, wherein each of the images within said sets is captured irrespective of the vehicle's movement or of the vehicle's orientation with respect to the capturing camera;
   b. a database for pre-storing images of basic-parts of at least one vehicle, wherein said basic-parts are selected from the vehicle door-handles, wipers, the right and left mirrors, the four wheels, the license plates, lights, and manufacturer's symbols;
   c. a first determination unit which is configured to, based on said pre-stored basic-parts images, determine the location of one or more basic-parts within images of said "handover" and "return" sets of captured images;
   d. a second determination unit which is configured to, based on said determined locations of the one or more vehicle's basic parts within the captured images, respectively, determine the locations of "other parts" of the vehicle within said "handover" and "return" sets of images, thereby to form "handover" and "return" part-images, respectively;
   e. a transformation unit which is configured to separately transform each pair of "handover" and "return" part-images, respectively, to a same plane, wherein said transformation further includes performing of one or more of: displacement, rotation and zoom of a first image relative to a second image in the pair;
   f. a comparison unit configured to separately compare pixel-by-pixel each of said transformed pairs of "handover" and "return" part-images, to thereby detect a difference above a predefined threshold, and to alert when such a difference above the threshold is detected.

2. A system according to claim 1, wherein said "handover" and "return" sets of images are captured at different times, possibly by different sets of one or more cameras.

3. A system according to claim 1, wherein each of the cameras has a resolution of at least 2 megapixels.

4. A system according to claim 1, wherein said alert further comprising a location indication within at least one part-image in the pair.

5. A system according to claim 1, wherein said first determination unit is configured to apply image recognition techniques.

6. A system according to claim 1, wherein said at least one camera is a mobile-phone camera.

7. A system according to claim 1, wherein said at least one camera is an in-vehicle camera of another vehicle.

8. A system according to claim 1, wherein said set of "handover" images is a reduced set, comprising the vehicle's one-side only images, and wherein the system further comprising a mirroring module which is configured to transform an image of a first side of the vehicle to an image of the second side of the vehicle.

9. System according to claim 1, wherein each of said "handover" and "return" sets comprising images that cover the entire exterior of the vehicle.

10. System according to claim 1, further comprising a damage-cost database, and a module for estimating the cost of the damage based on a part which was indicated by said alert and on said damage-cost database.

11. System according to claim 1, for use by one or more of: a vehicle's car-rental or leasing company, a vehicle fleet-operation company, an insurance company, a vehicle maintenance shop, an autonomous-vehicle operation company, car selling company, a vehicle-sharing company, or by a car dealer shop.

12. A method for automatically detecting a damage to a vehicle, comprising:
   a. pre-storing at a database images of basic-parts of at least one vehicle, wherein said basic-parts are selected from the vehicle door-handles, wipers, the right and left mirrors, the four wheels, the license plates, lights, and manufacturer's symbols;
   b. capturing by at least one camera a set of "handover" images of a vehicle, each of the images is captured irrespective of the vehicle's movement or of the vehicle's orientation with respect to the capturing camera;
   c. capturing at a later stage a set of "return" images of the vehicle, each of the images is also captured irrespective of the vehicle's movement or of the vehicle's orientation with respect to the capturing camera and possibly also by different cameras than those who captured said "handover" images;
   d. activating a first determination unit to determine, based on said pre-stored basic-parts images, the location of one or more basic-parts within images of said "handover" and within images of said "return" sets of images;
   e. activating a second determination unit to determine, based on said locations of the one or more vehicle's basic parts within the images, the locations of "other parts" of the vehicle within said "handover" and "return" sets of images, thereby to form "handover" and "return" part-images, respectively;
   f. activating a transformation unit to separately transform each pair of "handover" and "return" part-images, respectively, to a same plane, wherein said transformation further includes performing of one or more of: displacement, rotation and zoom of a first image relative to the second image in the pair;
   g. separately comparing pixel-by-pixel each of said transformed pairs of "handover" and "return" part-images, to thereby detect a difference above a predefined threshold, and to alert when such a difference above the threshold is detected.

13. A method according to claim 12, wherein each of the cameras has a resolution of at least 2 megapixels.

14. A method according to claim 12, wherein said alert further comprising a location indication within at least one part-image in the pair.

15. A method according to claim 12, wherein said first determination unit applies image recognition techniques.

16. A method according to claim 12, wherein said at least one camera is a mobile-phone camera.

17. A method according to claim 12, wherein said at least one camera is an in-vehicle camera of another vehicle.

18. A method according to claim 12, wherein said set of "handover" images is a reduced set, comprising the vehicle's one-side only images, and wherein the method further comprising a mirroring step which for transforming an image of a first side of the vehicle to an image of the second side of the vehicle.

19. A method according to claim 12, wherein each of said "handover" and "return" sets comprising images that cover the entire exterior of the vehicle.

20. A method according to claim 12, further comprising a damage-cost database, and wherein the method further comprising a step of activating a module for estimating the cost of the damage based on a part which was indicated by said alert and on said damage-cost database.

21. A method according to claim 12, for use by one or more of: a vehicle's car-rental or leasing company, a vehicle fleet-operation company, an insurance company, a vehicle maintenance shop, an autonomous-vehicle operation company, car selling company, a vehicle-sharing company, or by a car dealer shop.

* * * * *